Patented Nov. 10, 1931

1,831,795

UNITED STATES PATENT OFFICE

LEONARD E. BRANCHEN AND CHAUNCEY U. PRACHEL, OF ROCHESTER, NEW YORK, ASSIGNORS TO EASTMAN KODAK COMPANY, OF ROCHESTER, NEW YORK, A CORPORATION OF NEW YORK

PROCESS OF LOWERING THE VISCOSITY OF CELLULOSE ACETATE

No Drawing.    Application filed March 4, 1930.    Serial No. 433,175.

This invention relates to a process for the reduction of the viscosity of cellulose acetate, i. e., its viscosity when dissolved in a suitable solvent, and particularly to a process whereby cellulose acetate is subjected to viscosity reduction by temperature treatment.

There have been various processes disclosed in the art and in the literature for treating cellulose acetate to reduce its viscosity. Through some molecular rearrangement or other physical or chemical action, resulting from the employment of these processes, the cellulose acetate is rendered less viscous when a given amount is dissolved in a solvent. The particular advantage derived from the use of such a cellulose acetate is primarily that in the preparation of lacquers a sufficient amount of the ester can be dissolved in the solvent mixture so that films of appreciable thickness may be sprayed or brushed upon the surface to be lacquered. Without this viscosity lowering treatment cellulose acetate lacquers are impracticable for most lacquer uses, mainly due to the thinness of the films coated from them. In artificial silk manufacture also, the filaments can be extruded more economically from low viscosity cellulose acetate, as there is less solvent to recover per hank of silk produced.

Cellulose acetate has been treated in various manners to effect this desirable result. For example, cellulose acetate has been formed by high temperature acetylation which, to a certain degree, lowers the viscosity of the cellulose acetate in solution, although a drastic degradation of the ester often occurs. Gaseous treatment of the cellulose acetate has likewise been suggested for the treatment of the ester in the precipitated or solvated form.

None of these processes, however, have proven entirely satisfactory due to the film brittleness, limited solubility, or other reasons, and investigators in this art have, therefore, attempted to provide processes wherein this treatment can be more readily and economically conducted, without the inherent disadvantages of the known processes.

An object of the present invention is to provide a process for so treating cellulose acetate that its viscosity in solution is lowered. Another object is the treatment of comminuted cellulose acetate at a suitable temperature until the desired viscosity lowering of the cellulose acetate has been obtained. A further object is the treatment of cellulose acetate free from solvent media at an elevated temperature to effect the viscosity reduction. Other objects will hereinafter appear.

We have found that cellulose acetate preferably in the finely comminuted form when subjected to an elevated temperature for a certain period will have a considerably lower viscosity, when it is dissolved in a solvent, than cellulose acetate not so treated. This pre-treatment of the comminute cellulose acetate through some chemical rearrangement or physical action on the cellulose ester effects the viscosity reduction with little deleterious action upon the ester itself with the result that films of good flexibility may be formed therefrom.

In some instances this viscosity reduction takes place somewhat more favorably in the absence of solvents of the ester. This is especially true in the absence of any or all solvents which tend to gelatinize the cellulose acetate at room temperature or at the temperature of the reaction. We have found that viscosity reduction can be efficiently and economically carried out by such treatment and particularly so if the ester is rendered in comminuted form during the removal of the solvent or by other means.

The cellulose acetate can be economically comminuted to the desired extent by spray drying the cellulose acetate in a manner similar to that described in the U. S. patent to W. R. Webb, 1,516,225, which subdivides the material to particles having the magnitude of approximately 1/200 of an inch or less. This may likewise be effected by the extrusion of the cellulose ester from the solution in which it was acetylated through small orifices into a precipitation solution such as water or other non-solvent of the ester. If an alkaline carbonate or carbonate carrier is added to the acetylating bath prior to such precipitation as described in the co-pending application of Webber and Staud, Serial Number 414,210, a more finely divided and therefore more rapidly acted upon cellulose ester will be obtained. Furthermore, this subdivision of the cellulose acetate may be effected in the manner described in the co-pending application of Harry LeB. Gray, Serial Number 240,943, in which there is added to the cellulose acetate, prior to its precipitation, a low boiling liquid,—upon precipitating such a solution into a warm precipitating bath, the cellulose acetate is converted, through the vaporization of the low boiling liquid into a fluffy, finely divided form of the ester, very susceptible to our treatment. Any other process for the subdivision of the cellulose acetate either by a mechanical or physical-chemical process may be employed, but we have found that the above processes have many advantages.

Any of the above-described processes for the subdivision or comminution of the cellulose acetate will simultaneously remove therefrom a large proportion of the solvent occluded by the cellulose acetate. If the spray drying method be employed, however, further washing of the cellulose acetate is useful. In the case of the aqueous or non-solvent precipitation of the ester, some subsequent washing to remove therefrom the solvent and other contaminating ingredients resulting from the esterification is likewise useful.

Subsequent to the comminution or comminution and desolvation of the cellulose acetate, it is placed in a suitable container and heated to a temperature of 120° C. to 180° C. and held at that temperature preferably while agitating until the viscosity of the cellulose acetate has been lowered to the desired extent. At a temperature of 120° C. and lower, the time required to obtain the maximum lowering of the viscosity will often be quite extensive, running in some instances to as much as one hundred days to obtain the maximum effect, while at higher temperatures, however, the time of treatment is much shorter. The higher the temperature of treatment, the more extensive will be the molecular degradation of the cellulose acetate with a corresponding decrease in the flexibility of film formed from solutions thereof. It is, therefore, desirable to coordinate the temperature of the treatment with the flexibility of the final film to such a point that the desired viscosity with the optimum flexibility will be realized. We have found that a temperature in the neighborhood of 150° C. for most purposes gives such optimum results.

In order that those skilled in the art may more readily appreciate the advantages of our process, we are giving here the results of two viscosity reduction operations. A batch of cellulose acetate free from solvents and highly comminuted was heated at a temperature of approximately 141° C. The viscosity of this cellulose acetate in 1:15 acetone solution was 6.1 seconds prior to treatment. In 7 hours the viscosity was lowered to 2.1 seconds, at 13 hours its viscosity in the same solvent and in the same proportions was 2.0 seconds. The viscosity can be reduced still lower but the films of cellulose acetate which has been treated for too great a time are not of the best quality. A second batch was treated in the same manner and at the same temperature, its viscosity was reduced to 4.3 seconds after 7 hours treatment its initial viscosity was 20.7 seconds. At 13 hours the viscosity was reduced to 2.3 seconds and after 29 hours to 0.6 seconds. Film from cellulose acetate solution which has been treated for 29 hours at this temperature was not of the best quality but was nevertheless suitable for some purposes. The viscosities in all cases were determined in a solution containing 1 part of cellulose acetate to 5 parts of acetone, by the drop ball method.

From the above considerations it is apparent that the viscosity of any type of untreated cellulose acetate, (and when we refer to the viscosity of cellulose acetate in this disclosure, and in the claims, we of course imply the viscosity of cellulose acetate when dissolved in a suitable solvent,) may be reduced by our process. The cellulose acetate may contain substantially no solvent or none at all and be treated at any suitable elevated temperature and in any type of apparatus, preferably in a finely comminuted form, without in any way departing from this invention or sacrificing any of its advantages.

What we claim as our invention and desire to be secured by Letters Patent of the United States is:

1. Process for the reduction of the viscosity of cellulose acetate which comprises subjecting cellulose acetate which is substantially free from volatile solvents to a temperature of 120° to 180° C.

2. Process for the reduction of the viscosity of cellulose acetate which comprises subjecting comminuted cellulose acetate which is substantially free from volatile solvents to a temperature of 120° to 180° C.

3. Process for the reduction of the viscosity of cellulose acetate which comprises subjecting comminuted cellulose acetate which is substantially free from volatile solvents and having a particle size of approximately 1/300 of an inch in diameter or less to a temperature of 120° to 180° C.

4. Process for the reduction of the viscosity of cellulose acetate which comprises freeing cellulose acetate from solvent media and then subjecting it to a temperature of 120° to 180° C.

5. Process for the reduction of the viscosity of cellulose acetate which comprises freeing cellulose acetate from all solvents and simultaneously sub-dividing it to a highly comminuted form and subsequently subjecting the solvent-free and comminuted cellulose acetate to a temperature between 120° and 180° C.

6. Process for the reduction of the viscosity of cellulose acetate which comprises spray drying cellulose acetate and subsequently heating to a temperature of 120° to 180° C. until the viscosity of the cellulose acetate has been lowered.

7. Process for the reduction of the viscosity of cellulose acetate which comprises freeing the cellulose acetate from substantially all solvents, simultaneously sub-dividing to a highly comminuted form and subsequently subjecting the solvent-free and comminuted cellulose acetate to a temperature of approximately 150° C.

Signed at Rochester, New York, this 24th day of February, 1930.

LEONARD E. BRANCHEN.
CHAUNCEY U. PRACHEL.

CERTIFICATE OF CORRECTION.

Patent No. 1,831,795.  Granted November 10, 1931, to

LEONARD E. BRANCHEN ET AL.

It is hereby certified that error appears in the printed specification of the above numbered patent requiring correction as follows: Page 2, line 66, for "1:15" read 1:5; and that the said Letters Patent should be read with this correction therein that the same may conform to the record of the case in the Patent Office.

Signed and sealed this 9th day of February, A. D. 1932.

(Seal)

M. J. Moore,
Acting Commissioner of Patents.